United States Patent
Lin et al.

(10) Patent No.: US 9,344,234 B2
(45) Date of Patent: *May 17, 2016

(54) SCELL RADIO LINK MONITORING AND RADIO LINK FAILURE HANDLING

(71) Applicant: MEDIATEK INC., Hsinchu (TW)

(72) Inventors: Shiang-Jiun Lin, Hsinchu (TW); Per Johan Mikael Johansson, Kungsangen (SE); Yih-Shen Chen, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/720,932

(22) Filed: May 25, 2015

(65) Prior Publication Data
US 2015/0256300 A1    Sep. 10, 2015

Related U.S. Application Data

(63) Continuation of application No. 13/460,679, filed on Apr. 30, 2012, now Pat. No. 9,042,315.

(60) Provisional application No. 61/481,850, filed on May 3, 2011.

(51) Int. Cl.
*H04L 12/26* (2006.01)
*H04L 5/00* (2006.01)
(Continued)

(52) U.S. Cl.
CPC .............. *H04L 5/001* (2013.01); *H04J 11/005* (2013.01); *H04L 5/006* (2013.01); *H04W 24/02* (2013.01);
(Continued)

(58) Field of Classification Search
None
See application file for complete search history.

(56) References Cited

U.S. PATENT DOCUMENTS

| 8,488,443 B2 | 7/2013 | Lee et al. ...................... 370/216 |
| 8,570,854 B2 | 10/2013 | Jung et al. ..................... 370/216 |

(Continued)

FOREIGN PATENT DOCUMENTS

| CN | 101771438 A | 7/2010 |
| CN | 101867953 A | 10/2010 |

(Continued)

OTHER PUBLICATIONS

International Search Report and Written Opinion of International Search Authority for PCT/CN2012/075024 dated Aug. 23, 2012(10 pages).

(Continued)

*Primary Examiner* — Michael J Moore, Jr.
(74) *Attorney, Agent, or Firm* — Imperium Patent Works; Zheng Jin

(57) ABSTRACT

A method of radio link monitoring (RLM) and radio link failure (RLF) handling over a secondary serving cell (SCELL) is proposed. In a wireless network, a user equipment (UE) establishes a radio resource control (RRC) connection with a base station (eNB). The UE applies carrier aggregation for multiple component carriers (CCs) configured as multiple serving cells. The UE performs radio link monitoring over a primary serving cell (PCELL). The UE also performs radio link monitoring over a secondary serving cell (SCELL). The SCELL belongs to a CC group of one or more CCs, and used as a reference cell for the CC group. When SCELL performance is below pre-defined criteria, the UE and the eNB apply certain actions over the SCELL. The proposed SCELL RLM/RLF handling prevents spurious and uncontrollable uplink SCELL transmission and interference to other UEs.

21 Claims, 6 Drawing Sheets

(51) Int. Cl.
- *H04W 72/08* (2009.01)
- *H04W 36/30* (2009.01)
- *H04J 11/00* (2006.01)
- *H04W 24/02* (2009.01)
- *H04W 76/02* (2009.01)
- *H04W 36/00* (2009.01)

(52) U.S. Cl.
CPC .......... *H04W 36/30* (2013.01); *H04W 72/085* (2013.01); *H04W 76/025* (2013.01); *H04W 76/027* (2013.01); *H04W 36/0083* (2013.01)

(56) References Cited

U.S. PATENT DOCUMENTS

| | | | |
|---|---|---|---|
| 8,666,321 B2 | 3/2014 | Narasimha et al. | 455/67.11 |
| 2011/0134774 A1 | 6/2011 | Pelletier et al. | 370/252 |
| 2011/0267957 A1 | 11/2011 | Du et al. | 370/241 |
| 2012/0057527 A1 | 3/2012 | Ou | 370/328 |
| 2012/0155355 A1 | 6/2012 | Kwon et al. | 370/311 |
| 2012/0213107 A1 | 8/2012 | Jang et al. | 370/252 |
| 2012/0214540 A1 | 8/2012 | Narasimha et al. | 455/525 |
| 2012/0214541 A1 | 8/2012 | Narasimha et al. | 455/525 |
| 2013/0021979 A1 | 1/2013 | Kwon et al. | 370/328 |
| 2013/0136015 A1 | 5/2013 | Ojala et al. | 370/252 |

FOREIGN PATENT DOCUMENTS

| | | |
|---|---|---|
| JP | 2011040851 | 5/2011 |
| JP | 2012099875 | 5/2012 |
| WO | WO2010088329 A1 | 1/2009 |
| WO | WO2011063244 A2 | 11/2009 |
| WO | WO2010078962 A1 | 7/2010 |
| WO | WO2010105148 A1 | 9/2010 |
| WO | WO2011021814 A2 | 2/2011 |

OTHER PUBLICATIONS

Taiwan IPO, Office Action of the TW patent application 101115541 dated Aug. 20, 2014 (7 pages).

R2-094804 3GPP TSG-RAN WG2 Meeting #67; InterDigital; physical Channel Establishment and Radio Link Failure Procedures; Shenzhen, China dated Aug. 24-28, 2009 (10 pages).

R2-094324 3GPP TSG RAN WG2 Meeting #67; CATT; Consideration on Radio Link Failure in CA; Shenzhen, China dated Aug. 24-28, 2009 (3 pages).

JPO, Office Action of the JP patent application 2014-501435 dated Sep. 30, 2014 (9 pages).

R2-105321 3GPP TSG-RAN WG2 Meeting #71bis; Nokia Siemens Networks Nokia Corporation; Radio link Monitoring of SCells; Xian, China dated Oct. 11-15, 2010 (3 pages).

R2-100423 3GPP TSG-RAN WG2 Meeting #68bis; Qualcomm Incorporated; Supporting Multiple Timing Advance Groups; Valencia, Spain dated Jan. 18-22, 2010 (3 pages).

R4-103962 3GPP TSG-RAN WG4 Ad-hoc Meeting #2010-04; Reply LS on Radio link Monitoring for Carrier Aggregation; RAN WG4; Xi'an, China dated Oct. 11-15, 2010 (2 pages).

SIPO, Office Action of the CN patent application 201280000808.9 dated Oct. 29, 2014 (9 pages).

R2-106416 3GPP TSG-RAN WG2#72; InterDigital Communications; Radio Link Monitoring on SCells; Jacksonville, USA dated Nov. 15-19, 2010 (3 pages).

R2-106243 3GPP TSG-RAN WG2 Meeting #72; Qualcomm Incorporated, NTT DOCOMO Inc.; RL Monitoring for Pathloss Reference SCell; Jacksonville, US dated Nov. 15-19, 2010 (10 pages).

EPO, Search Report for the EP patent application 12779714.0 dated Feb. 3, 2016 (9 pages).

3GPP TSG-RAN WG2 Meeting #73bis R2-112316, MediaTek Inc., Discussion on SCell radio link handling in Rel-11, Shanghai, China dated Apr. 11-15, 2011 (4 pages).

SCELL RADIO LINK MONITORING AND RADIO LINK FAILURE HANDLING

CROSS REFERENCE TO RELATED APPLICATIONS

This application is a continuation, and claims priority under 35 U.S.C. §120 from nonprovisional U.S. patent application Ser. No. 13/460,679, entitled "SCELL Radio Link Monitoring and Radio Link Failure Handling," filed on Apr. 30, 2012, the subject matter of which is incorporated herein by reference. Application Ser. No. 13/460,679, in turn, claims priority under 35 U.S.C. §119 from U.S. Provisional Application No. 61/481,850, entitled "Scell Radio Link Monitoring and Radio Link Failure Handling," filed on May 3, 2011, the subject matter of which is incorporated herein by reference.

TECHNICAL FIELD

The disclosed embodiments relate generally to radio link monitoring (RLM) and radio link failure (RLF) handling, and, more particularly, to RLM and RLF handling for secondary serving cells (SCELLs) with carrier aggregation (CA).

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs). Radio link monitoring (RLM) is a mechanism for a UE to monitor the quality of a downlink (DL) for determining if the radio link is good enough to continue transmission. For example, the UE shall monitor the DL quality based on cell-specific reference signal (CRS) to detect the downlink radio link quality for the serving cell. The UE shall also compare the estimated DL quality to thresholds $Q_{OUT}$ and $Q_{IN}$ for monitoring the downlink radio link quality of the serving cell. In addition to RLM, the UE shall consider radio link failure (RLF) to be detected upon physical layer problems based on N310/N311/T310 mechanism, random access problem indication from MAC layer, and indication from RLC layer that the maximum number of retransmissions has been reached. Once RLF is detected, the UE gathers and stores RLF information and attempts RRC connection reestablishment. If such attempt fails, the UE goes back to RRC_IDLE. The UE may indicate the availability of the RLF report to eNB and report the RLF information to eNB upon request after successful RRC connection reestablishment or RRC connection setup.

In LTE Rel-10, the concept of carrier aggregation (CA) has been introduced to enhance the system throughput. With CA, two or more CCs are aggregated to support wider transmission bandwidth up to 100 MHz. A Rel-10 UE with reception and/or transmission capabilities for CA can simultaneously receive and/or transmit on multiple CCs corresponding to multiple serving cells. When CA is configured, the UE has only one RRC connection with the network. At RRC connection establishment/reestablishment or handover, one serving cell provides the NAS mobility information. At RRC connection reestablishment or handover, one serving cell provides the security input. This cell is referred to as the primary serving cell (PCELL), and other cells are referred to as the secondary serving cells (SCELLs). Depending on UE capabilities, SCELLs can be configured to form together with the PCELL as a set of serving cells.

RLM and RLF are only applied on PCELL in LTE Rel-10. RLF detection on DL PCELL is based on N310/N311/T310 mechanism. Deactivation and removal of DL SCELL suffering poor link quality should be under eNB command. Therefore, no autonomous UE deactivation and removal of such SCELL is allowed. Radio link monitoring (i.e., RLF physical layer problem detection based on N310/N311/T310) by the UE is not needed for DL SCELLs, because it is assumed that eNB can detect poor link quality e.g. from CQI reports and/or existing RRM measurement reports. Random access failure on UL PCELL triggers RRC connection reestablishment. UE never autonomously stops any transmission on an UL SCELL based on DL SCELL link quality.

In LTE rel-11, inter-band UL CA will be supported. In addition, various CA deployment scenarios will be supported, including inter-entity carrier aggregation, inter-eNB/intra-RAT carrier aggregation, and inter-eNB/inter-RAT carrier aggregation. For example, inter-entity carrier aggregation involves carrier aggregation through different transmission entities such as eNB with Remote Radio Header (RRH) and eNB with frequency selective repeaters. In these CA deployment scenarios, the UL timing advance values and the DL pathloss estimation for UL power control may be different from different paths, different entities, different frequency bands, and/or different RATs. For example, a UL SCELL may transmit through a different frequency band from UL PCELL and/or a UL SCELL may transmit through a different entity from UL PCELL. As a result, the timing advance and the pathloss on the SCELL could be very different from that of the PCELL.

In current state, RLM is only applied on PCELL, which is insufficient to determine if the radio link is good enough to continue transmission on SCELL. The RLF detection on physical layer problem is also only applied on PCELL, which cannot prevent interference to other users when SCELL is out-of-sync. For example, if radio link problem happens on DL SCELL used as a timing reference cell, it will cause incorrect UL timing so that inter symbol interference to other users may happen. Similarly, if radio link problem happens on DL SCELL used as a pathloss reference cell, it will cause incorrect pathloss estimation so that spurious UL SCELL transmission may happen and introduce interference to other users. Furthermore, the RLF detection upon random access problem is only applied on PCELL. Once the random access problem occurs on SCELL, the behavior is unclear. To prevent spurious and uncontrollable UL SCELL transmission and to monitor the random access on SCELL, a solution is sought.

SUMMARY

A method of radio link monitoring (RLM) and radio link failure (RLF) handling over a secondary serving cell (SCELL) is proposed to prevent spurious and uncontrollable uplink (UL) SCELL transmission and interference to other users. In a wireless network, a user equipment (UE) establishes a radio resource control (RRC) connection with a base station (eNB). The UE applies carrier aggregation for multiple component carriers (CCs) configured as multiple serving cells. The UE performs radio link monitoring over a primary serving cell (PCELL). The UE also performs radio link monitoring over a secondary serving cell (SCELL). The SCELL belongs to a CC group of one or more CCs, and used as a reference cell for the CC group. When SCELL performance is below pre-defined criteria, the UE and the eNB apply certain actions over the reference SCELL.

In one embodiment, the wireless network is deployed with carrier aggregation scenarios such as inter-entity CA, inter-eNB/intra-RAT CA, or inter-eNB/inter-RAT CA. In these CA deployment scenarios, the uplink (UL) timing advance (TA) values and the downlink (DL) pathloss estimation for uplink power control may be different from different paths, different entities, different frequency bands, and/or different RATs. As a result, the aggregated component carriers (CCs) to the UE are divided into CC groups. CCs share the same TA value and/or CCs share the same pathloss value are configured into the same CC group. In each CC group, one CC is chosen as the pathloss reference CC, and the same or a different CC is chosen as the timing reference CC. In one novel aspect, RLM/RLF is applied on both PCELL and the reference SCELL(s).

Upon RLF detection over the SCELL, the UE may autonomously stop UL transmission over the RLF SCELL or all SCELLs in the same CC group. The UE action to stop UL transmission may be done by deactivation of the SCELL of all SCELLs in the same CC group. The UE may gather and record problem event information and store SCELL RLF information. For example, the SCELL RLF information may be stored in VarRLF-Report containing the failed SCELL ID. The UE may automatically inform eNB an SCELL RLF notification through other activated serving cell. The notification may include the detected problem such as an SCELL RLF has occurred, the deactivation of an SCELL or a group of SCELLs, and the availability of recorded problem event information for later gathering by the network. The UE may also directly report to eNB the SCELL RLF report. From eNB perspective, upon receiving an SCELL RLF indication or the SCELL RLF report, the eNB may deactivate the RLF SCELL or a group of SCELLs in the same CC group by sending a MAC deactivation control element to the UE. Alternatively, the eNB may de-configure the RLF SCELL or a group of SCELLs in the same CC group by sending an RRC connection reconfiguration message to the UE.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
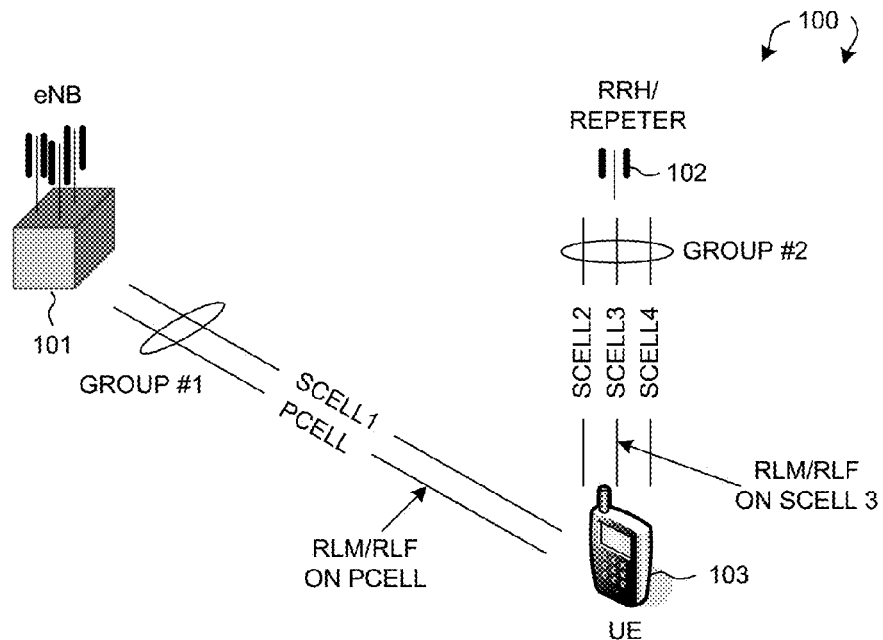
FIG. 1 illustrates a wireless communication network with inter-entity CA and SCELL RLM/RLF in accordance with one novel aspect.

Reference will now be made in detail to some embodiments of the invention, examples of which are illustrated in the accompanying drawings.

In 3GPP Long-Term Evolution (LTE) networks, various carrier aggregation (CA) deployment scenarios are possible, which includes inter-entity carrier aggregation, inter-eNB/intra-RAT carrier aggregation, and inter-eNB/inter-RAT carrier aggregation. In these CA deployment scenarios, the uplink (UL) timing advance (TA) values and the downlink (DL) pathloss estimation for uplink power control may be different from different paths, different entities, different frequency bands, and/or different RATs. As a result, the aggregated component carriers (CCs) to a UE can be divided into CC groups. CCs share the same TA value and/or CCs share the same pathloss value are configured into the same CC group. In each CC group, one CC is chosen as the pathloss reference CC, where the UL transmit power should be calculated based on the DL pathloss estimated from this pathloss reference CC. Similarly, in each CC group, one CC is chosen as the timing reference CC, where the UL transmit timing should be calculated based on the DL timing of the timing reference CC and the TA value provided by the network. The pathloss reference CC and the timing reference CC in each CC group may be the same cell or different cells. When there are multiple CC groups in a UE, one CC group contains the primary serving cell (PCELL), while the other CC groups contain only the secondary serving cells (SCELLs). When CA is configured, the UE only has one radio resource control (RRC) connection with the network that is maintained over PCELL.

In LTE Rel-10, radio link monitoring (RLM) and radio link failure (RLF) detection is only applied on PCELL, not on SCELLs. This is because it is assumed that eNB can detect poor link quality e.g. from Channel Quality Indicator (CQI) reports and/or existing RRM measurement reports. Such assumption, however, is not reliable because the CQI reports do not always promptly reflect the radio link qualities. For example, the CQI measurement is averaging over several subframes and the reporting of CQI is pre-configured, i.e., periodic CQI reporting. Although eNB can trigger aperiodic CQI reporting from a UE, in some cases, eNB may not have full knowledge and full control on each SCELL, for example, CQI report is error or missing. Besides, the UL signaling overhead for the aperiodic CQI report is a concern. On the other hand, continued to use an out-of-sync SCELL will cause interference to other users. For example, if radio link problem happens on DL SCELL used as a timing reference cell, it will cause incorrect UL timing so that inter symbol interference to other users may happen. Similarly, if radio link problem happens on DL SCELL used as a pathloss reference cell, it will cause incorrect pathloss estimation so that spurious UL SCELL transmission may happen and introduce interference to other users. Therefore, to prevent spurious and uncontrollable UL SCELL transmission, the RLM/RLF mechanisms are applied on selected SCELL(s) as well as on PCELL.

FIG. 1 illustrates a wireless communication network 100 with inter-entity carrier aggregation and SCELL RLM/RLF in accordance with one novel aspect. Wireless network 100 comprises an eNB 101, a remote radio head RRH 102, and a UE 103. For inter-entity CA deployment scenario, at least one CC is from eNB and at least one CC is from the other entity which is under control by eNB, e.g., RRH and frequency selective repeater. These CCs are aggregated to UE 103. Among the aggregated CCs, one CC is configured as PCELL and other CCs are configured as SCELLs. In the example of FIG. 1, CCs from the same entity have the same TA value, and CCs from the same entity in the same frequency band have the same/similar pathloss phenomenon. For example, PCELL and SCELL1 from eNB 101 to UE 103 have the same TA value, while SCELL2, SCELL3, and SCELL4 from RRH 102 to UE 103 have the other TA value. As a result, PCELL and SCELL1 are configured as CC group #1, and SCELL2, SCELL3, and SCELL4 are configured as CC group #2. In one novel aspect, RLM/RLF is not only applied on PCELL for CC group #1 for maintaining RRC connection, but also applied on SCELL3, which is configured as the pathloss/timing reference cell for CC group #2.

Figure 2:
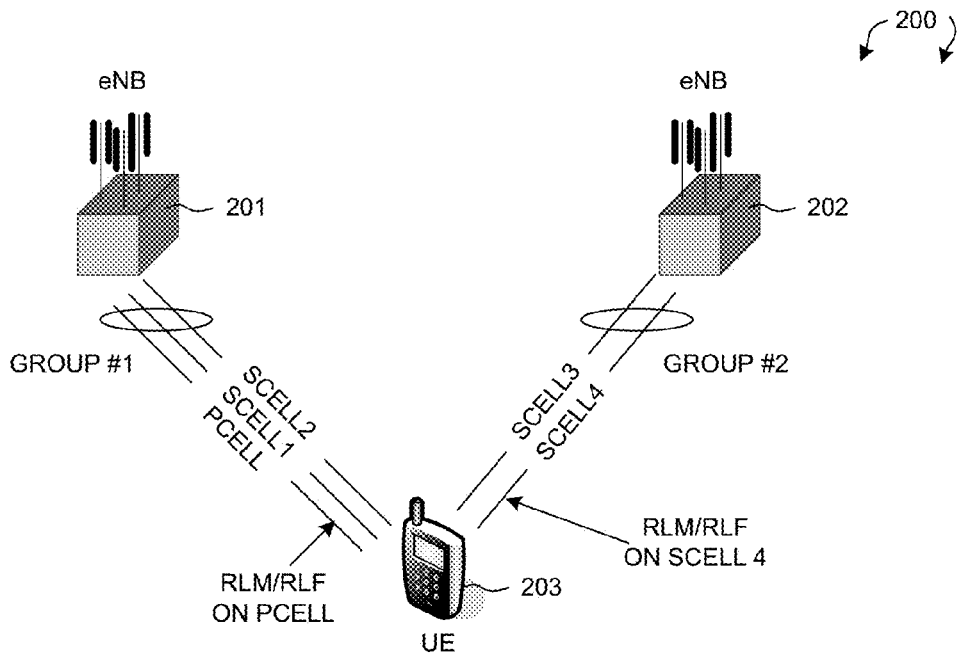
FIG. 2 illustrates a wireless communication network with inter-eNB/intra-RAT CA and SCELL RLM/RLF in accordance with one novel aspect.

FIG. 2 illustrates a wireless communication network 200 with inter-eNB/intra-RAT carrier aggregation and SCELL RLM/RLF in accordance with one novel aspect. Wireless network 200 comprises a first eNB 201, a second eNB 202, and a UE 203. For inter-eNB/intra-RAT CA deployment scenario, at least one CC is from one eNB and at least one CC is from the other eNB. These CCs are aggregated to UE 203. Among the aggregated CCs, one CC is configured as PCELL and other CCs are configured as SCELLs. In the example of FIG. 2, CCs from the same eNB have the same TA value, and CCs from the same eNB in the same frequency band have the same/similar pathloss phenomenon. For example, PCELL, SCELL1, and SCELL 2 from eNB 201 to UE 203 have the same TA value, while SCELL3 and SCELL4 from eNB 202 to UE 203 have the other TA value. As a result, PCELL, SCELL1, and SCELL2 are configured as CC group #1, and SCELL3 and SCELL4 are configured as CC group #2. In one novel aspect, RLM/RLF is not only applied on PCELL for CC group #1 for maintaining RRC connection, but also applied on SCELL4, which is configured as the pathloss/timing reference cell for CC group #2.

Figure 3:
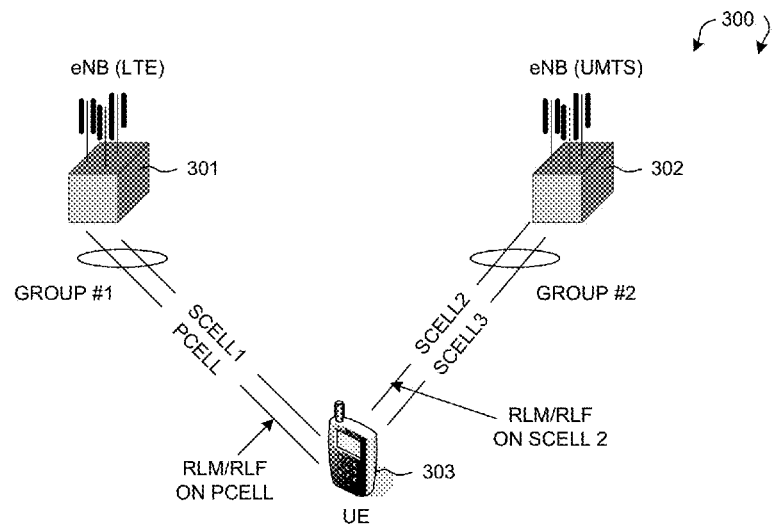
FIG. 3 illustrates a wireless communication network with inter-eNB/inter-RAT CA and SCELL RLM/RLF in accordance with one novel aspect.

FIG. 3 illustrates a wireless communication network 300 with inter-eNB/inter-RAT carrier aggregation and SCELL RLM/RLF in accordance with one novel aspect. Wireless network 300 comprises a first eNB 301 (for LTE radio access technology), a second eNB 302 (for UMTS radio access technology), and a UE 303. For inter-eNB/inter-RAT CA deployment scenario, at least one CC is from one RAT and at least one CC is from the other RAT. These CCs are aggregated to UE 303. Among the aggregated CCs, one CC is configured as PCELL and other CCs are configured as SCELLs. In the example of FIG. 3, CCs from the same RAT have the same TA value, and CCs from the same RAT in the same frequency band have the same/similar pathloss phenomenon. For example, PCELL and SCELL1 from eNB 301 (LTE) to UE 303 have the same TA value, while SCELL2 and SCELL3 from eNB 302 (UMTS) to UE 303 have the other TA value. As a result, PCELL and SCELL1 are configured as CC group #1, and SCELL2 and SCELL3 are configured as CC group #2. In one novel aspect, RLM/RLF is not only applied on PCELL for CC group #1 for maintaining RRC connection, but also applied on SCELL2, which is configured as the pathloss/timing reference cell for CC group #2.

Figure 4:
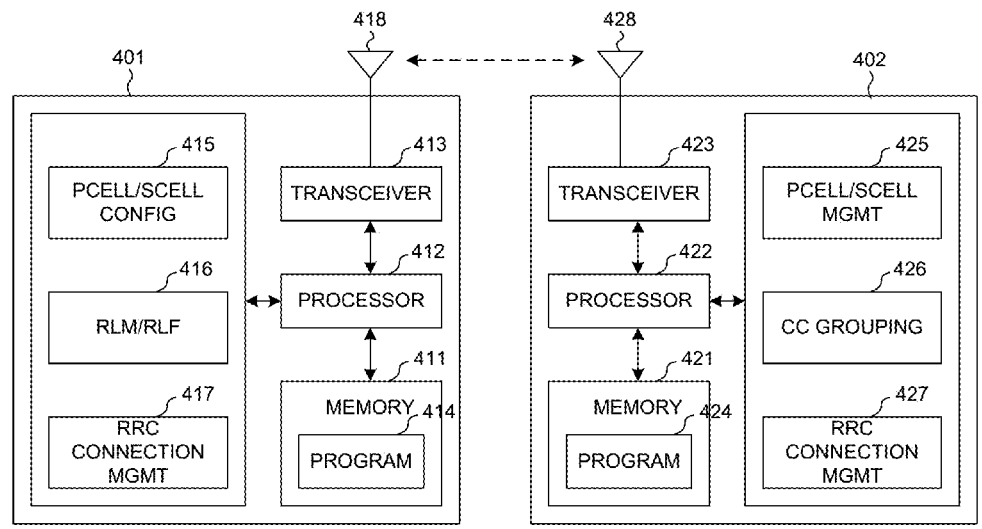
FIG. 4 is a simplified block diagram of a UE and an eNB in accordance with one novel aspect.

FIG. 4 is a simplified block diagram of a UE 401 and an eNB 402 in accordance with one novel aspect of SCELL RLM/RLF handling. UE 401 comprises memory 411, a processor 412, a transceiver 413 coupled to an antenna 418. UE 401 also comprises various function modules including a cell configuration module 415 that performs cell configuration, an RLM/RLF module 416 that performs radio link monitoring, radio link failure detection and handling, and an RRC connection management module 417 that performs RRC connection setup procedures and maintains RRC connection. Similarly, eNB 402 comprises memory 421, a processor 422, a transceiver 423 coupled to an antenna 428. eNB 402 also comprises various function modules including a cell management module 425 that performs cell configuration, a CC-grouping module 426 that configures multiple CC groups, and an RRC connection management module 427 that performs RRC connection setup procedures and maintains RRC connection. The different modules are function modules that can be implemented by software, firmware, hardware, or any combination thereof. The function modules, when executed by the processors (e.g., via executing program codes 414 and 424), allow UE 401 and eNB 402 to perform RLM/RLF handling on PCELL as well as on selected SCELLs for each configured CC group.

Figure 5:
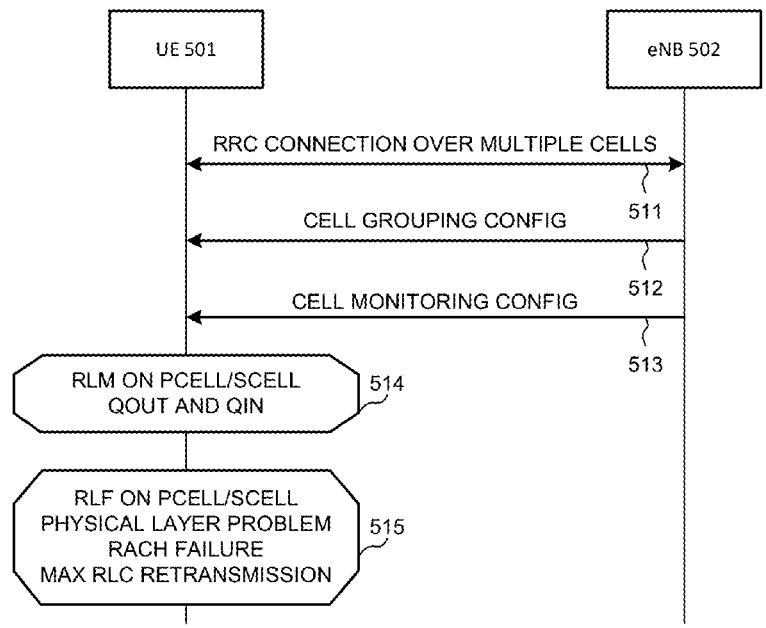
FIG. 5 illustrates one embodiment of applying RLM and RLF handling on selected SCELL.

FIG. 5 illustrates one embodiment of applying RLM and RLF handling on selected SCELLs in a wireless network 500. In step 511, UE 501 establishes an RRC connection with eNB 502. The RRC connection is established over multiple CCs including one PCELL and a plurality of SCELLs. In step 512, eNB 502 applies CC-grouping configuration for UE 501. In step 513, eNB 502 applies CC-monitoring configuration for UE 501. The CC-grouping and CC-monitoring configuration may be based on RRC configuration by dedicated signaling or broadcast signaling provided to UE 501 by eNB 502. For example, based on a specific CA deployment scenario, eNB 502 will group CCs that have the same pathloss/timing to the same CC group, and then select one or more cells in the CC group as the pathloss/timing reference cells. Alternatively, the reference cells can be chosen by the UE in each CC group. In accordance with one novel aspect, for a CC group that does not contain PCELL, the SCELL used as the pathloss reference cell for UL power control and/or used as the timing reference cell is selected as the SCELL for RLM/RLF.

In step 514, UE 501 performs RLM on PCELL and the selected SCELLs. For example, UE 501 monitors the DL quality based on cell-specific reference signal (CRS) to detect the downlink radio link quality for PCELL and the selected SCELLs. UE 501 also compares the estimated DL quality to thresholds $Q_{OUT}$ and $Q_{IN}$ for monitoring downlink radio link quality of PCELL and the selected SCELLs. $Q_{OUT}$ is defined as the level at which the downlink radio link cannot be reliably received. Typically, $Q_{OUT}$ (out-of-sync) corresponds to an approximate 10% block error ratio of a hypothetical PDCCH transmission taking into account a number of network settings and radio conditions. On the other hand, $Q_{IN}$ (in-sync) is normally a 2% block error ratio. The threshold $Q_{OUT}$ and $Q_{IN}$ for SCELLs may be the same as PCELL, or be tighter than PCELL, i.e., easier to detect physical layer problem because the RRC connection is not maintained over SCELLs.

Figure 6:
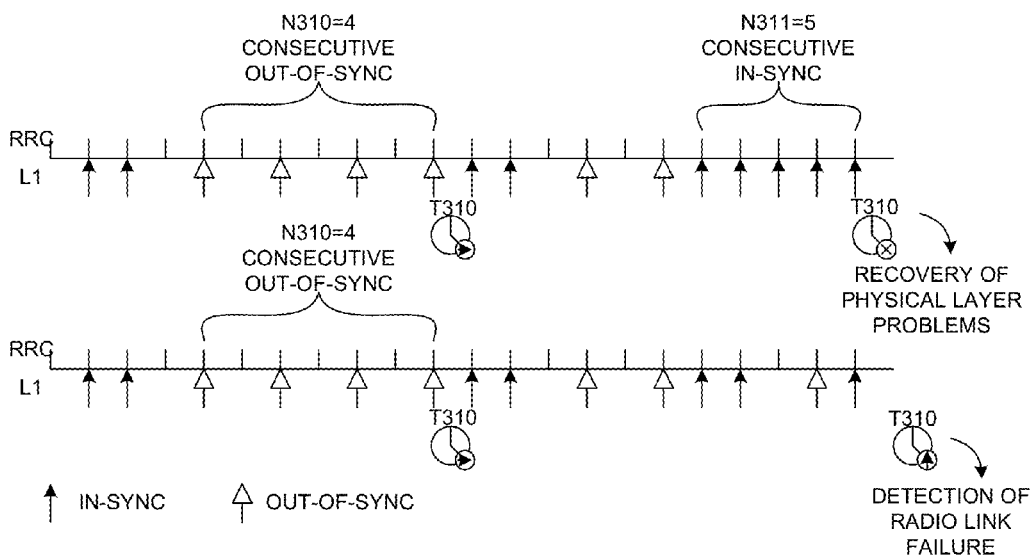
FIG. 6 illustrates one embodiment of radio link failure detection on physical layer problem.

In addition to RLM, in step 515, UE 501 performs RLF handling on PCELL and the selected SCELLs. There are three possible ways of detecting RLF. First, in RRC_CONNECTED state, RLF can be detected upon physical layer problems based on N310/N311/T310 mechanism. FIG. 6 illustrates one embodiment of radio link failure detection on physical layer problem. In the example of FIG. 6, physical layer problem is detected upon receiving N310 (e.g., N310=4) consecutive "out-of-sync" indications from lower layers (e.g., L1). A T310 timer starts to run upon the detection. The detected physical layer problem is recovered upon receiving N311 (e.g., N311=5) consecutive "in-sync" indications from lower layers while the T310 timer is still running. If no recovery when T310 is running, upon T310 expiry, RLF is detected. The values of N310/N311/T310 for SCELLs may be configurable, which may be the same as those of PCELL or SCELL-specific.

Second, RLF can be detected upon random access problem indication from the media access control (MAC) layer. Random access procedure is typically performed over PCELL. However, random access procedure may be applied on certain SCELL (e.g., used as a timing reference cell) in order to obtain timing advance value on the SCELL. The random access may be contention based or non-contention based. Upon random access channel (RACH) failure, the mechanism based on maximum number of RACH preamble transmission is used for RLF detection on the SCELL applying random access. For example, if the number of RACH preamble transmission exceeds a maximum threshold value (e.g., preambleTransMax), then the MAC layer indicates a random access problem to upper layers, which in turn trigger RLF detection. The value of preambleTransMax for SCELL may be configurable, which may be the same as that of PCELL or SCELL-specific.

Finally, RLF can be detected upon indication from the radio link control (RLC) layer that the maximum number of retransmission has been reached. The RLC layer maintains a retransmission counter, which is CC-independent. The RLC problem over SCELL may be treated the same ways as for PCELL. Once RLF is detected, the UE needs to handle the detected radio link failure.

Figure 7:
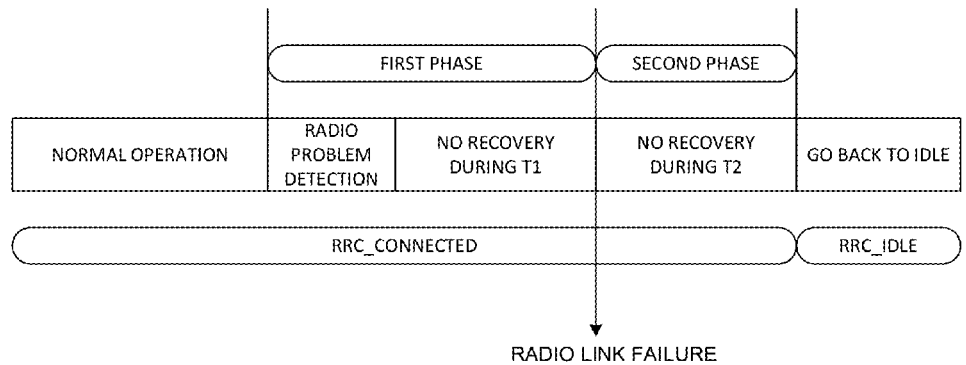
FIG. 7 illustrates one embodiment of radio link failure detection and handling over PCELL.

FIG. 7 illustrates one embodiment of radio link failure detection and handling over PCELL. In general, two phases govern the behavior associated with RLF. Suppose a UE is in RRC_CONNECTED mode and in normal operation. The first phase starts upon a radio problem detection, and leads to radio link failure detection based on timer or other criteria (e.g., no recovery during T1). The second phase starts upon radio link failure detection, and leads to RRC_IDLE based on timer (e.g., no recovery during T2). Typically, the UE attempts RRC reestablishment during the second phase, and goes back to RRC_IDLE if such attempt fails. After successful RRC connection, the UE may indicate the availability of stored RLF report to eNB and report the RLF information to eNB upon request. While this is the typical behavior for RLF handling over PCELL, RLF handling over SCELL can be much different. For example, the UE may not need to trigger RRC reestablishment because the connection on PCELL still exists.

Figure 8:
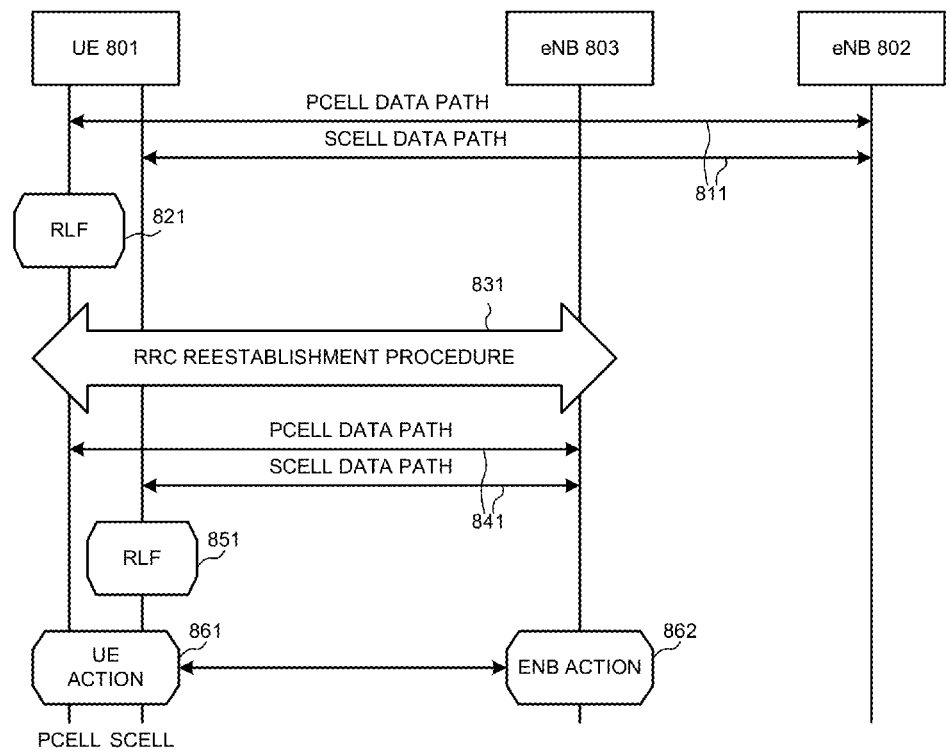
FIG. 8 illustrates radio link failure handling over both PCELL and SCELL.

FIG. 8 illustrates radio link failure handling for both PCELL and SCELL in a wireless network 800. In step 811, UE 801 establishes an RRC connection with an original eNB 802. While there is only one RRC connection, under carrier aggregation, UE 801 communicates with eNB 802 over a PCELL data path and an SCELL data path. The RRC connection is maintained over PCELL, and UE 801 performs RLM/RLF over PCELL. In step 821, UE 801 detects RLF over PCELL. In step 831, UE 801 finds another suitable cell and performs RCC reestablishment procedure with eNB 803. Upon successful RRC reestablishment, in step 841, UE 801 establishes a new RRC connection with eNB 803. UE 801 communicates with eNB 803 over a PCELL data path and an SCELL data path. The new RRC connection is maintained over PCELL. Suppose that PCELL and SCELL belong to two different CC groups due to different timing/pathloss. UE 801 thus performs RLM/RLF over both PCELL and SCELL. In step 851, UE 801 detects RLF over SCELL. In step 861, UE 801 performs certain actions based on the detected RLF over SCELL. Likewise, in step 862, eNB 803 performs certain actions based on the detected RLF over SCELL. The details of the UE and eNB actions for SCELL RLF handling are illustrated below.

Figure 9:
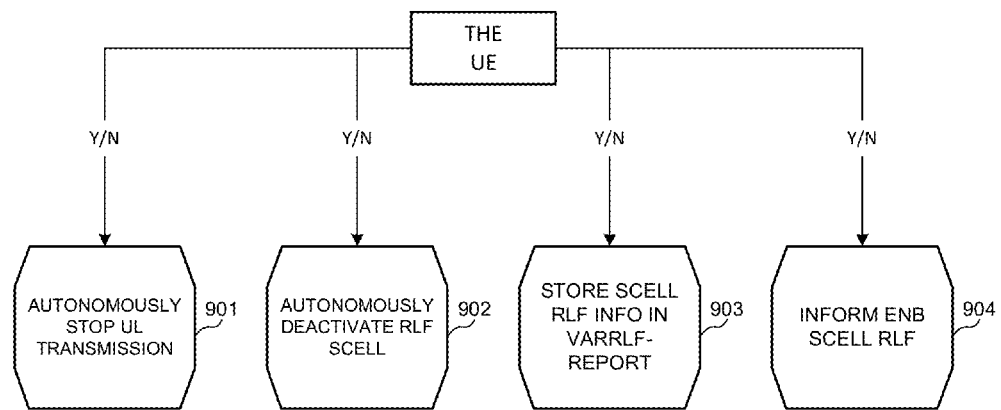
FIG. 9 illustrates possible UE actions based on RLM and RLF detection over SCELL.

FIG. 9 illustrates possible UE actions upon RLF detection over SCELL. In option 901, the UE autonomously stops UL transmission over the RLF SCELL or all SCELLs in the same CC group as the RLF SCELL to avoid uncontrollable UL transmission and to prevent interference to other users. The UE flushes all HARQ buffers associated with the SCELL, stops transmitting SRS for the SCELL, stops reporting CQI/PMI/RI for the SCELL, stops transmitting on UL-SCH for the SCELL, and stops monitoring PDCCH on the SCELL. In option 902, the UE autonomously deactivates the RLF SCELL or all SCELLs in the same CC group as the RLF SCELL to avoid uncontrollable UL transmission and to prevent interference to other users. Upon an SCELL deactivation, the UE stops the SCELL deactivation timer associated with the SCELL, flushes all HARQ buffers associated with the SCELL, stops transmitting SRS for the SCELL, stops reporting CQI/PMI/RI for the SCELL, stops transmitting on UL-SCH for the SCELL, and stops monitoring PDCCH on the SCELL.

In option 903, the UE gathers and records problem event information and stores SCELL RLF information. For example, the SCELL RLF information may be stored in VarRLF-Report containing the failed SCELL ID. The gathered problem event information may include available mobility measurements, triggering mechanism for the RLF detection (e.g., DL monitoring reason, RACH reason, and RLC reason), available information in device coexistence state that could have caused the problem, and available geographical location information. Furthermore, the RRC UE information procedure (optionally the RLF report) is reused to carry the recorded information to the network.

In option 904, the UE automatically informs eNB an SCELL RLF notification through other activated serving cell. The notification may include the detected problem such as an SCELL RLF has occurred, the deactivation of an SCELL or a group of SCELLs, and the availability of recorded problem event information for later gathering by the network. The UE may also directly report to eNB the SCELL RLF report. The notification may be implemented by a MAC layer control element (CE), an RRC message on PUSCH, or a PHY layer indication by PUCCH. In addition, the UE may inform eNB the detected SCELL RLF problem by keep sending a specific CQI value on that SCELL through PCELL PUCCH until the problematic RLF SCELL is deactivated/de-configured. In one example, the specific CQI value to indicate SCELL RLF may be set as zero.

Figure 10:
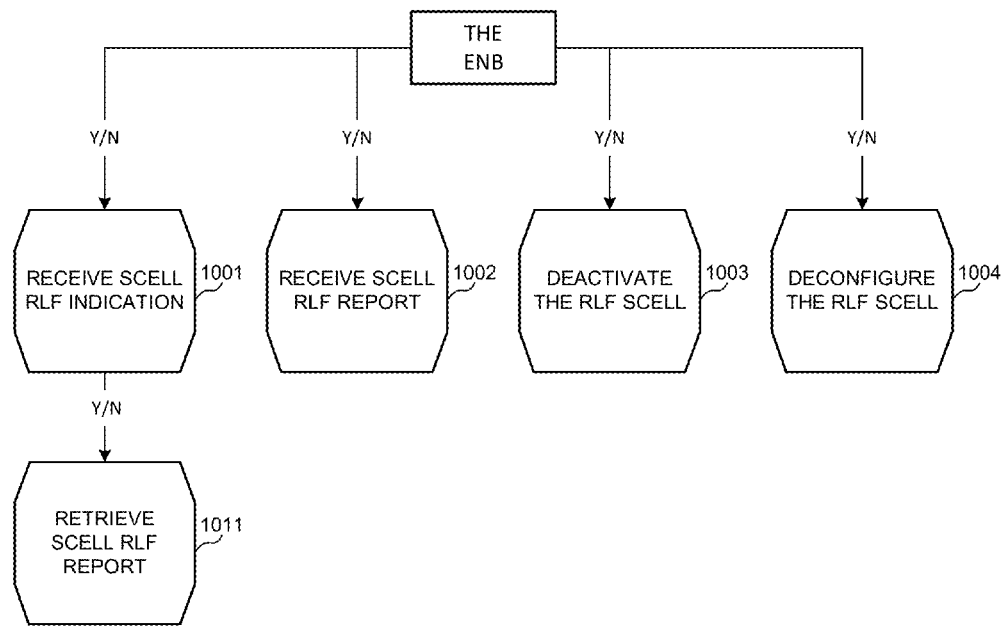
FIG. 10 illustrates possible eNB actions upon receiving SCELL RLF indication and RFL report.

FIG. 10 illustrates possible eNB actions upon receiving SCELL RLF indication and/or RFL report. In option 1001, the eNB receives an SCELL RLF indication from a UE. Following option 1001, in option 1011, the eNB retrieves the SCELL RLF report. For example, the eNB sends an UE information request with "RLF report request=TRUE" to the UE. In response, the UE sends an UE information response with the RLF report back to the eNB. In option 1002, the eNB receives the SCELL RLF report directly from the UE. In option 1003, the eNB deactivates the RLF SCELL or a group of SCELLs in the same CC group by sending a MAC activation/deactivation control element to the UE. In option 1004, the eNB de-configure the RLF SCELL or a group of SCELLs in the same CC group by sending an RRC connection reconfiguration message to the UE. Upon an SCELL deactivation, the UE stops the SCELL deactivation timer associated with the SCELL, flushes all HARQ buffers associated with the SCELL, stops transmitting SRS for the SCELL, stops reporting CQI/PMI/RI for the SCELL, stops transmitting on UL-SCH for the SCELL, and stops monitoring PDCCH on the SCELL.

Figure 11:
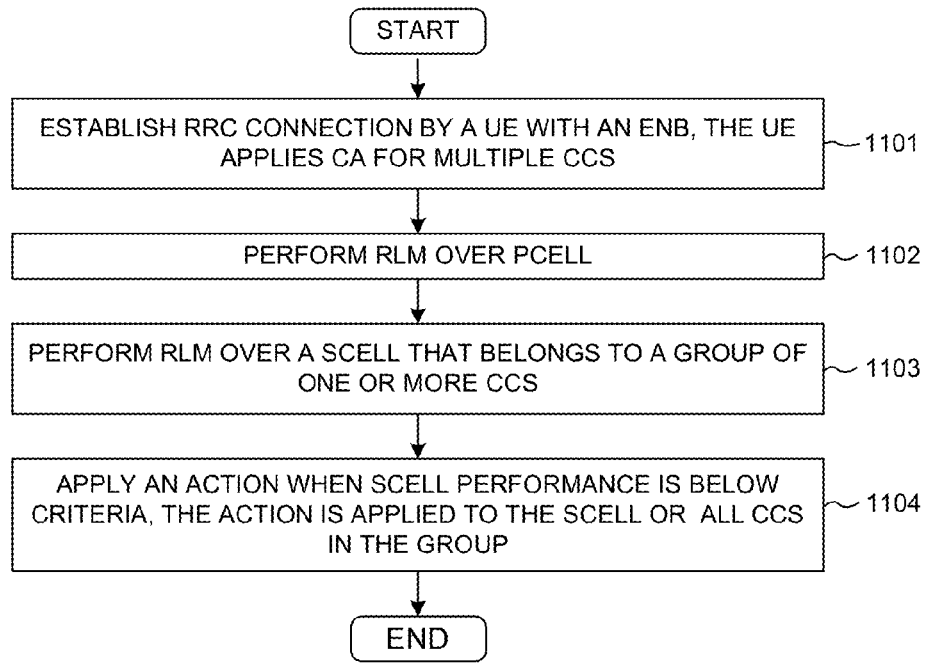
FIG. 11 is a flow chart of a method of RLM and RLF handling over SCELL from UE perspective in accordance with one novel aspect.

FIG. 11 is a flow chart of a method of RLM and RLF handling over SCELL from UE perspective in accordance with one novel aspect. In step 1101, a user equipment (UE) establishes a radio resource control (RRC) connection with a base station (eNB). The UE applies carrier aggregation for multiple component carriers (CCs) configured as multiple serving cells. In step 1102, the UE performs radio link monitoring over a primary serving cell (PCELL). In step 1103, the UE performs radio link monitoring over a secondary serving cell (SCELL). The SCELL belongs to a CC group of one or more CCs. In step 1104, the UE applies an action when SCELL performance is below pre-defined criteria. The action is applied over the SCELL or all CCs in the same CC group.

Figure 12:
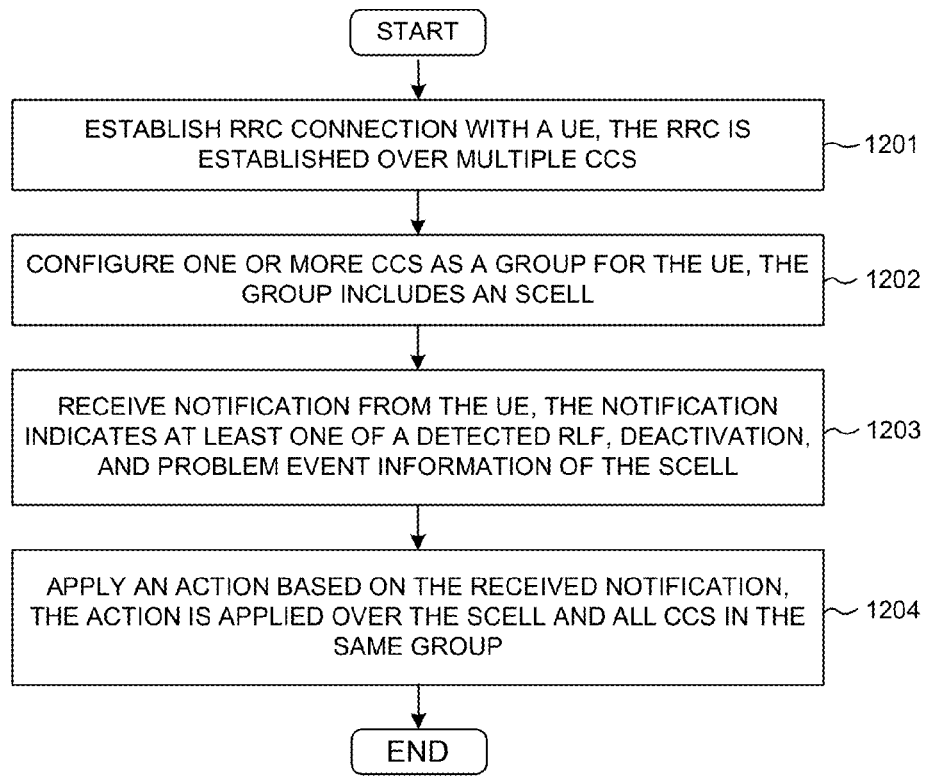
FIG. 12 is a flow chart of a method of RLM and RLF handling over SCELL from eNB perspective in accordance with one novel aspect.

FIG. 12 is a flow chart of a method of RLM and RLF handling over SCELL from eNB perspective in accordance with one novel aspect. In step 1201, a base station (eNB) establishes a radio resource control (RRC) connection with a user equipment (UE). The RRC connection is established over multiple component carriers (CCs) configured as multiple serving cells. In step 1202, the eNB configures one or more CCs as a CC group for the UE. The CC group includes one secondary serving cell (SCELL). In step 1203, the eNB receives a notification from the UE, the notification contains at least one of a detected radio link failure of the SCELL, a deactivation of the SCELL, and problem event information gathered for the SCELL. In step 1204, the eNB applies an action based on the received notification. The action, such as deactivation/de-configuration, is applied over the SCELL and/or all CCs in the same CC group.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   establishing a radio resource control (RRC) connection by a user equipment (UE) with a base station, where the UE applies carrier aggregation for multiple component carriers (CCs);
   performing radio link monitoring by the UE over a primary serving cell (PCELL), wherein the PCELL belongs to a first CC group of one or more CCs;
   selecting a secondary serving cell (SCELL) as a reference cell, wherein the SCELL belongs to a second CC group of one or more CCs;
   performing radio link monitoring by the UE over the selected reference SCELL; and
   applying an action when the SCELL performance is below a pre-defined criteria, wherein the action is applied over the reference SCELL.

2. The method of claim 1, wherein the reference SCELL is used as a pathloss reference and/or a timing advance reference.

3. The method of claim 1, wherein the reference SCELL is used to perform a random access channel (RACH) procedure.

4. The method of claim 1, wherein the radio link monitoring involves downlink monitoring based on $Q_{IN}/Q_{OUT}$ measurements.

5. The method of claim 4, wherein the radio link monitoring involves radio link failure detection based on detecting a physical layer problem of the RRC connection based on an N310/N311/T310 mechanism.

6. The method of claim 1, wherein the radio link monitoring involves uplink-monitoring including radio link failure detection based on random access channel (RACH) failure detection and/or a maximum number of radio link control (RLC) retransmissions.

7. The method of claim 1, wherein the action involves the UE notifying the base station at least one of a detected radio link failure of the reference SCELL, a deactivation of the reference SCELL, availability of problem event information gathered for the reference SCELL, and problem event information gathered for the reference SCELL.

8. The method of claim 1, wherein the action involves the UE autonomously stopping uplink transmission over the reference SCELL.

9. A user equipment (UE), comprising:
   a radio frequency (RF) transceiver that exchanges radio signals with a base station in a wireless network;
   a radio resource control (RRC) connection management module that establishes an RRC connection with the base station, where the RRC connection is established over multiple component carriers (CCs);
   a radio link monitoring module that performs radio link monitoring over a primary serving cell (PCELL) belonging to a first CC group of one or more CCs and over a selected reference secondary serving cell (SCELL), wherein the reference SCELL belongs to a second CC group of one or more CCs; and
   an SCELL configuration module that applies an action when the reference SCELL performance is below a pre-defined criteria, wherein the action is applied over the reference SCELL.

10. The UE of claim 9, wherein the reference SCELL is used as a pathloss reference and/or a timing advance reference.

11. The UE of claim 9, wherein the reference SCELL is used to perform a random access channel (RACH) procedure.

12. The UE of claim 9, wherein the radio link monitoring involves downlink monitoring based on $Q_{IN}/Q_{OUT}$ measurements.

13. The UE of claim 12, wherein the radio link monitoring involves radio link failure detection based on detecting a physical layer problem of the RRC connection based on a N310/N311/T310 mechanism.

14. The UE of claim 9, wherein the radio link monitoring involves uplink-monitoring including radio link failure detection based on random access channel (RACH) failure detection and/or a maximum number of radio link control (RLC) retransmissions.

15. The UE of claim 9, wherein the action involves the UE notifying the base station at least one of a detected radio link failure of the reference SCELL, deactivation of the reference SCELL, availability of problem event information gathered for the reference SCELL, and the problem event information gathered for the reference SCELL.

16. The UE of claim 9, wherein the action involves the UE autonomously stopping uplink transmission over the reference SCELL.

17. A base station, comprising:
   a radio resource control (RRC) connection management module that establishes an RRC connection with a user equipment (UE), where the RRC connection is established over multiple component carriers (CCs);

a CC grouping module that configures one or more CCs as a CC group for the UE, wherein the group includes one secondary serving cell (SCELL) as a reference cell;

a radio frequency (RF) transceiver that receives a notification from the UE, wherein the notification contains at least one of a detected radio link failure of the reference SCELL, a deactivation of the reference SCELL, availability of problem event information gathered for the reference SCELL, and the problem event information gathered for the reference SCELL; and an SCELL configuration module that applies an action based on the received notification, wherein the action is applied over the reference SCELL.

18. The base station of claim 17, wherein the reference SCELL is used as a pathloss reference and/or a timing advance reference for the CC group.

19. The base station of claim 17, wherein the reference SCELL is used to perform a random access channel (RACH) procedure.

20. The base station of claim 17, wherein the action involves deactivating or de-configuring the reference SCELL.

21. The base station of claim 17, wherein the action involves requesting and retrieving gathered problem event information from the UE.

* * * * *